United States Patent [19]

Pelzer et al.

[11] 4,030,897
[45] June 21, 1977

[54] DEGASSING OF LIQUIDS

[75] Inventors: Rudolf Pelzer, Herzogenrath; Heinz Scholl, Eschweiler, both of Germany

[73] Assignee: Saint-Gobain Industries, Neuilly-sur-Seine, France

[22] Filed: Nov. 25, 1975

[21] Appl. No.: 635,374

[30] Foreign Application Priority Data

Nov. 28, 1974 France .............................. 74.38961

[52] U.S. Cl. ....................................... 55/42; 55/57; 55/195; 55/203; 55/208; 233/DIG. 1; 233/11; 233/31; 233/37; 233/47 R

[51] Int. Cl.² ........................................ B01D 19/00

[58] Field of Search .............. 55/41, 42, 52, 57, 58, 55/190, 203, 208, 409; 210/377, 342; 233/DIG. 1, 11, 31, 37, 46, 47 R

[56] References Cited

UNITED STATES PATENTS

| | | | |
|---|---|---|---|
| 2,169,601 | 8/1939 | Cornelius et al. | 233/11 |
| 3,856,483 | 12/1974 | Rumpf et al. | 55/52 |
| 3,928,003 | 12/1975 | Fryar | 55/190 |

*Primary Examiner*—Bernard Nozick
*Attorney, Agent, or Firm*—Karl W. Flocks

[57] ABSTRACT

Viscous liquids are degassed by a centrifuge in an enclosure at reduced pressure. The centrifuge has concentric annuli to provide a zig-zag path for the liquid. The enclosure may be heated.

8 Claims, 2 Drawing Figures

DEGASSING OF LIQUIDS

BACKGROUND OF THE INVENTION

This invention relates to degassing of very viscous liquids by centrifuging. The liquid to be degassed is introduced into a centrifuge bowl inside which it flows in the form of a thin layer while the gas is allowed to escape.

PRIOR ART

There exist several devices of this general type. The magazine "Chemie Ingenieur Technik" 1972 p. 497/503 provides an example in which the liquid to be degassed is brought in the form of a thin layer on to the internal surface of a rotor in the shape of a bell having its mouth upward from which it is moved towards the upper edge of the rotor. The layer of foam which is formed on the interior surface of the layer of liquid is separated from the layer of degassed liquid upper edge of the rotor by an orientable blade which also rotates.

It has been found that the effectiveness of these known devices is not sufficient if the viscosity of the liquid to be degassed is very large or when especially stringent requirements are imposed on the degree of degassing.

There already exist, for treating liquids such as oils and milk in order to remove heavier or lighter impurities, centrifuges having a multiple action of which the bowl is formed by a drum in which the liquid passes through successive chambers from the axis of rotation towards the envelope, following a zig-zag path along a series of cylindrical coaxial skirts fixed alternately to two side plates which form the end walls of the drum. Removal of liquid may be effected by means of a rotating joint but the drum may also be enclosed in a fixed enclosure; the impurities are deposited on the walls and are then removed by dismantling of the apparatus.

Finally there are known centrifuges of which the bowl is formed of a plate carrying a series of successive skirts overlapping between complementary skirts fixed on the cover of the enclosure which may be brought to a diffrent temperature by an assembly of members for regulating the temperature. These devices may, especially, be used for distillation of liquid which is introduced at a suitable distance from the axis in order to obtain the desired degree of reflux. They have the disadvantage of being relatively bulky and complicated to manufacture, and it has not been proposed to use them for degassing viscous liquids because these liquids, projected by the skirts of the drum on to the fixed skirts, would flow along the latter too slowly during each stage of centrifuging before following again to the mobile members.

GENERAL DESCRIPTION OF INVENTION

An object of the invention is to provide apparatus operating with a greater efficiency than known devices allowing, for a relatively small consumption of energy and under difficult conditions, good degassing of liquids.

According to the present invention, to obtain a good degassing efficiency, the enclosure of the centrifuge is held under reduced pressure (ideally a vacuum) and the centrifuge bowl has successive chambers defined by the skirts formed by annuli which leave staggered openings, all the skirts forming parts of the same drum which may be mounted between two bearings and provided with a hollow shaft through which the fluid feeding the apparatus flows towards a distributor formed of a plate. The plate may be adjacent an end wall, at the upper part of the first (inner) chamber.

Although, in certain cases, it suffices to provide the rotating drum with two concentric skirts it is easily possible to increase the number of skirts enclosed one in the others in order to increase the efficiency.

In a preferred embodiment of the invention, the external casing serves to join the end walls of the drum.

A preferred construction according to the invention is as follows: the external casing is fixed to the two end walls and the openings for passage of a liquid from one skirt to the next are made such that the interior skirt or skirts are alternately fixed at one end to each of the two end walls, a circular slit existing each time between the other end and the closest end wall.

However it is further possible to connect each internal skirt to the two end walls and provide, instead of the circular slits adjacent the end walls, passages through which the liquid can flow to the following skirt.

A vertical arrangement of the rotating drum allows axial feed on to the distributor plate placed inside the first chamber adjacent the upper end wall and integral in rotation with the assembly of the drum, a plate which serves for distributing the liquid inside the drum.

For very viscous liquids it may be advantageous to effect degassing at an elevated temperature. For this, according to another characteristic of the invention the enclosure in which the rotating drum is situated is capable of being heated.

DESCRIPTION OF PREFERRED EMBODIMENTS

Figure 1:
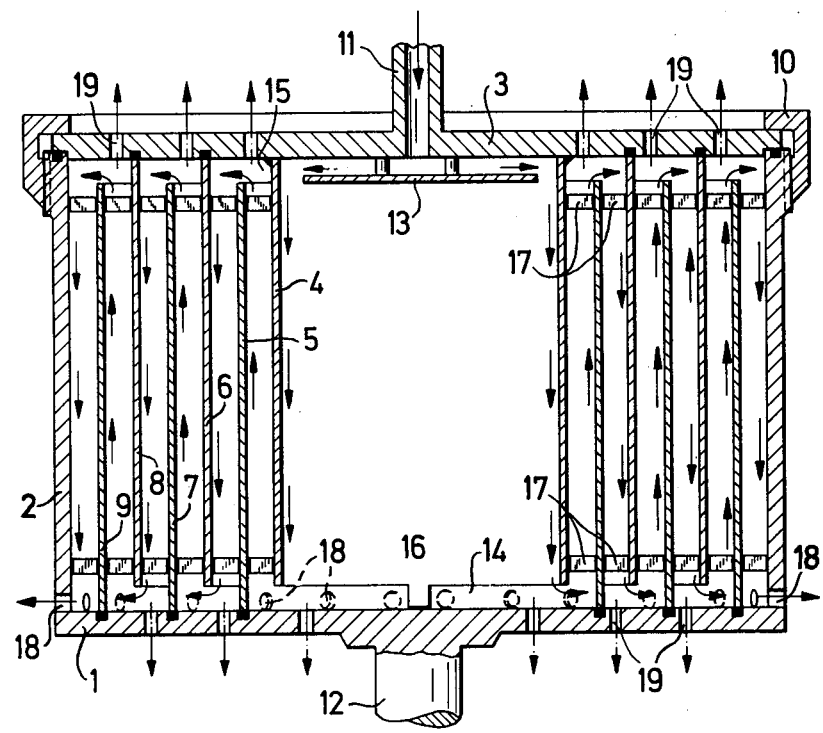
Figure 2:
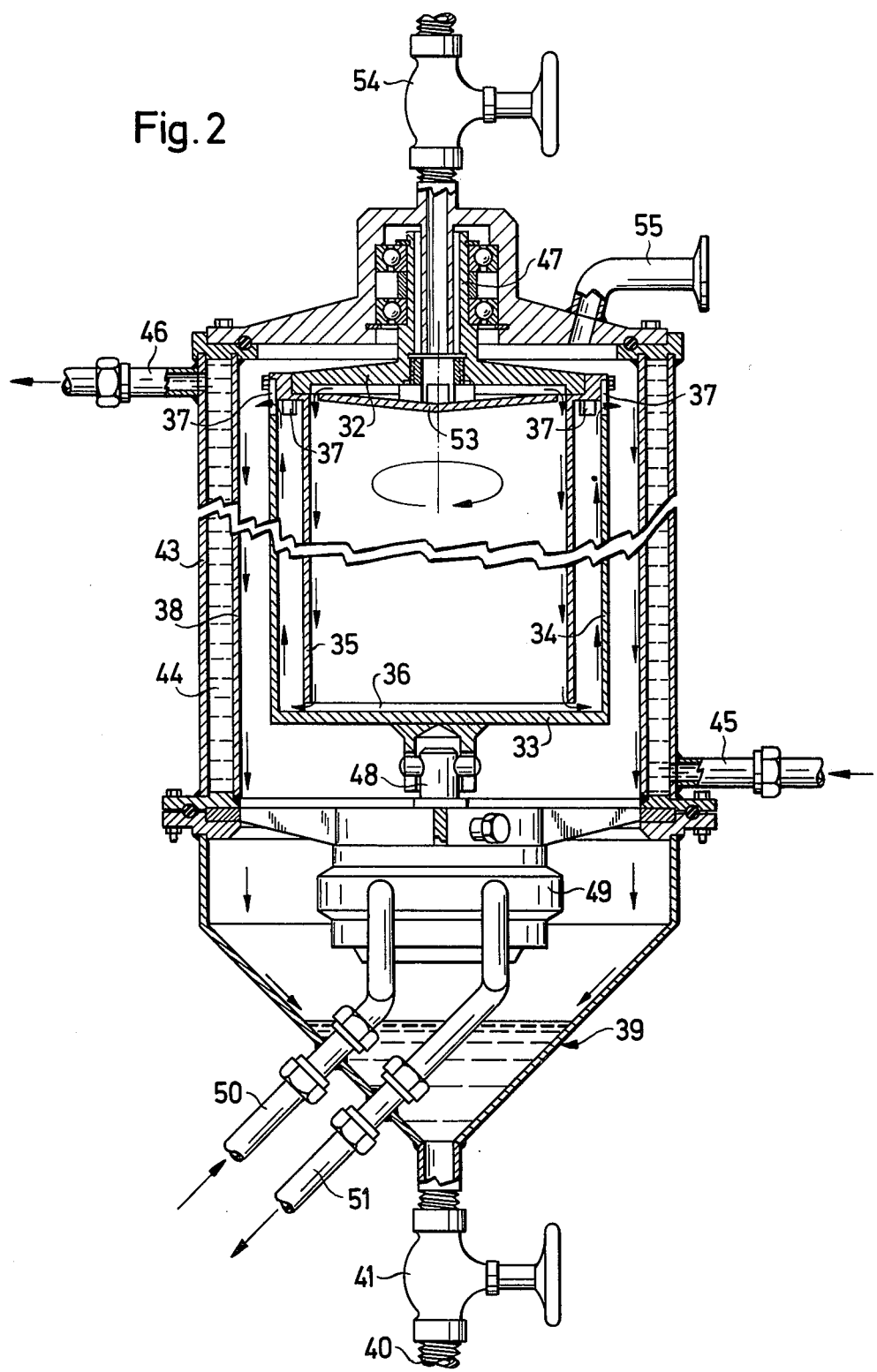

Preferred embodiments of the invention will now be described by way of example with reference to the accompanying drawings, in which:

FIG. 1 is a schematic section of a rotatable drum for a centrifugal degassing device according to the invention; and FIG. 2 is a complete degassing device according to another embodiment of the invention.

The basic structure of a rotating drum for a centrifuge is shown in section in FIG. 1. The drum comprises the end wall 1 forming the bottom of the drum, the casing 2 forming its external envelope which is connected to the bottom 1 and the upper end wall 3, and a series of concentric skirts 4 to 9 fixed alternately inside the drum to the lower wall 1 and the upper wall 3, itself fixed to the external casing 2 by means of a screw 10. The drum is mounted on two bearings by means of a hollow shaft 11 fixed to the upper end wall 3 and by shaft 12 fixed to the lower end wall 1, the drum being driven by shaft 12.

The liquid to be degassed is fed through the hollow shaft 11 on the distributor plate 13 which also rotates. The centrifugal force presses the feed against the interior skirt 4 in the form of a regular layer.

The skirt 4, fixed to the end plate 3 by its upper end, is slightly shorter than the internal height of the drum 1: there thus exists between the skirt 4 and the lower end wall a slit 14 through which the liquid flows in the direction indicated by the arrows and is pressed against the following skirt 5. The latter, also of steel, is fixed to the bottom 1 and leaves between its upper end and the upper wall 3 a space through which the liquid is impelled against the following skirt 6, and so on; thus the process described is reproduced for as many times as the number of concentric casings in the drum.

The skirts 5 to 9 may be, for example, fixed by welding to the end walls; they may also be inserted on these end walls in corresponding grooves, but it is then necessary to secure them at their free edges by means of spacing members 16 engaging the other end wall. Further it is useful for each skirt to be provided with spacers 17 owing to which they are held against the adjacent skirts. A drum constructed in this manner may easily be dismantled for cleaning.

In the external casing 2 there is provided a series of holes 18 distributed around the periphery of the end wall 1; the degassed liquid is projected through the holes out of the drum. In the end walls 1 and 3 there is provided a series of holes 19 by which gas and vapour leave the drum.

The liquid projected by the distributor plate 13 against the surface of the interior skirt 4, then from one skirt to the next up to the casing 2 under the action of the pressure derived from centrifugal force flows along the successive walls in layers which become progressively thinner.

FIG. 2 shows a installation for continuously degassing a liquid. The central part of the installation is a similar drum 42 having two skirts comprising two end walls 32, 33 the casing 34 and the interior skirt 35 separated from the end wall 33 by a slit 36. At the upper part of the casing 34 there are provided holes 37 distributed on the periphery and by which the liquid is projected out of the drum against the interior wall of the enclosure 38. The liquid flows along this wall in the direction of the arrows and accumulates in the part forming the tank 39 of the installation from which it is withdrawn in the form of degassed liquid by the duct 40 through an adjustable valve 41.

Around the wall 38 there is placed, at a distance a casing 43 which forms a jacket. The space 44 inside the jacket is traversed by a hot liquid. Thd duct 45 serves for feeding hot liquid and the duct 46 for discharge of this liquid.

The drum rotating in this heated enclosure has a hollow shaft 47 mounted in an upper bearing and rests at its lower part on the shaft 48 of the motor 49. In the case shown the motor 49 is an air turbine of which the speed is continuously adjustable.

The compressed air required for the turbine is supplied through the duct 50 and leaves by the duct 51. Any other appropriate driving means can be used, for example the rotating drum may form a short-circuit rotor inside a stator producing a rotating electric field. The liquid to be degassed is distributed continuously by the hollow shaft 47 on the distributor plate 53. The feed is regulated by a valve 54. The duct 55 is connected to a vacuum pump in order to put the whole apparatus under vacuum, the gas and vapour extracted from the liquid being aspirated by this duct.

We claim:

1. A method of degassing viscous liquids comprising the steps of
   feeding the liquid to be degassed through a duct to the interior of a centrifuge vessel located within an enclosure in which the gas pressure is reduced,
   simultaneously rotating said vessel about an axis passing through said duct,
   directing the flow of liquid from said duct in a direction substantially perpendicular to the direction of flow from said duct by means of a distributor plate within said vessel transverse to said axis of rotation,
   continuing the flow of liquid in a zig-zag path from the inside to the outside of said vessel over inner surfaces of a plurality of coaxial annuli and removing gas from said annuli and enclosure,
   and discharging the liquid from said enclosure.

2. The method of claim 1, further characterized by thinning the liquid in layer form by successive centrifugal operations.

3. The method of claim 2, further characterized by heating said enclosure.

4. A centrifuge for degassing viscous liquids under reduced pressure, which comprises an enclosure, a centrifuge vessel attached for rotation within said enclosure, motor means for rotating said vessel about an axis of rotation, a duct on said axis connecting into said vessel for feeding the liquid to be degassed to the interior of said vessel, and discharge means for discharging the degassed liquid from said enclosure, said enclosure being provided with evacuation means for reducing the gas pressure therein, said vessel comprising a plurality of coaxial annuli having inner surfaces including means defining a zig-zag path of flow for the liquid from the inside to the outside of said vessel, and a distributor comprising a plate within said vessel transverse to said axis to direct liquid entering said vessel through said hollow duct towards the innermost of said annuli and means for the removal of gas from said annuli.

5. A centrifuge according to claim 1, in which the enclosure is provided with heating means.

6. A centrifuge according to claim 1, in which the motor means is inside the enclosure.

7. A centrifuge according to claim 1, in which the motor means comprises a gas-driven turbine.

8. A centrifuge according to claim 1, in which the vessel comprises a pair of opposed radially extending end plates and each annulus is mounted on one of the end plates with a gap between the annulus and the other end plate, alternate annuli being mounted on different plates to provide said zig-zag path.

* * * * *

UNITED STATES PATENT AND TRADEMARK OFFICE
CERTIFICATE OF CORRECTION

PATENT NO. : 4,030,897

DATED : June 21, 1977

INVENTOR(S) : Rudolf Pelzer, Heinz Scholl

It is certified that error appears in the above-identified patent and that said Letters Patent are hereby corrected as shown below:

Column 1, line 20, after "degassed liquid" insert --at the--.

Column 1, line 43, "diffrent" should read --different--.

Column 1, line 53, "to" should read --on to--.

Column 3, line 38, "Thd" should read --The--.

Claim 5, line 1, "1" should read --4--.

Claim 6, line 1, "1" should read --4--.

Claim 7, line 1, "1" should read --4--.

Claim 8, line 1, "1" should read --4--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks